United States Patent
Reilly

(10) Patent No.: US 7,682,453 B2
(45) Date of Patent: Mar. 23, 2010

(54) SYSTEM AND METHOD FOR CONTROLLING HYDROGEN ELIMINATION DURING CARBON NANOTUBE SYNTHESIS FROM HYDROCARBONS

(75) Inventor: Peter T. A. Reilly, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 866 days.

(21) Appl. No.: 11/218,240

(22) Filed: Sep. 1, 2005

(65) Prior Publication Data

US 2007/0048210 A1 Mar. 1, 2007

(51) Int. Cl.
*D01F 9/12* (2006.01)
*D01C 5/00* (2006.01)

(52) U.S. Cl. .................... 118/715; 423/447.3; 977/843; 427/249.1

(58) Field of Classification Search ............. 423/447.3, 423/447.1; 977/843; 118/715, 716, 719, 118/732; 427/248.1, 249.1
See application file for complete search history.

(56) References Cited

U.S. PATENT DOCUMENTS 5,872,422 A * 2/1999 Xu et al. .................... 313/311
6,528,020 B1 * 3/2003 Dai et al. ..................... 422/98

2008/0206463 A1 * 8/2008 Grigorian et al. .......... 427/249.1

OTHER PUBLICATIONS

Murakami, et al., Growth of vertically aligned single-walled carbon nanotube films on quartz substrates and their optical anisotropy, Chemical Physics Letters 2004; 385: 298-303.*
Franklin, et al., Patterned growth of single-walled carbon nanotubes on full 4-inch wafers, Applied Physics Letters 2001; 79(27): 4571-4573.*
Huang, et al., Patterned Growth and Contact Transfer of Well-Aligned Carbon Nanotube Films, J. Phys. Chem. B. 1999; 103: 4223-4227.*
Lee, et al., Low-temperature growth of carbon nanotubes by thermal chemical vapor deposition using Pd, Cr, and Pt as co-catalyst, Chemical Physics Letters 2000; 327: 277-283.*
Zhang, et al., Rapid growth of well-aligned carbon nanotube arrays, Chemical Physics Letters 2002; 362: 285-290.*
Lou, et al., Hydrogen diffusion on fused silica at high temperatures, Journal of Non-Crystalline Solids 2003; 315: 13-19.*
Derbyshire et al., Graphite Formation by the Dissolution—Precipitation of Carbon in Cobalt, Nickel and Iron, Carbon, 13:111-113 (1975).

(Continued)

*Primary Examiner*—Stanley S. Silverman
*Assistant Examiner*—Daniel C. McCracken
(74) *Attorney, Agent, or Firm*—Novak Druce + Quigg LLP

(57) ABSTRACT

A system and method for producing carbon nanotubes by chemical vapor deposition includes a catalyst support having first and second surfaces. The catalyst support is capable of hydrogen transport from the first to the second surface. A catalyst is provided on the first surface of the catalyst support. The catalyst is selected to catalyze the chemical vapor deposition formation of carbon nanotubes. A fuel source is provided for supplying fuel to the catalyst.

14 Claims, 4 Drawing Sheets

OTHER PUBLICATIONS

Miki et al., Presoot and Soot Formations in Heating of Hydrocarbon Fuels, Bulletin of JSME, 29(247):149-155 (Jan. 1986).

Leong, Morphological Control of Particles Generated from the Evaporation of Solution Droplets: Theoretical Considerations, J. Aerosol Sci., 18(5):511-524, (1987).

Leong, Morphological Control of Particles Generated from the Evaporation of Solution Droplets: Experiment, J. Aerosol Sci., 18(5):525-552 (1987).

Pachuta et al., Excitation and Dissociation of Isolated Ions Derived from Polycyclic Aromatic Hydrocarbons, 110(3):657-665 (Feb. 3, 1988).

Baker, Catalytic Growth of Carbon Filaments, Carbon, 27(3):315-323 (1989).

Smalley, Self-Assembly of the Fullerenes, Acc. Chem. Res., 25:98-105 (1992).

Guo et al., Self-Assembly of Tubular Fullerenes, J. Phys. Chem., 99:10694-10697 (1995).

Dai et al., Single-Wall Nanotubes Produced by Metal-Catalyzed Disproportionation of Carbon Monoxide, Chem. Phys. Let. 260:471-475 (1996).

Kong et al., Chemical Vapor Deposition of Methane for Single-Walled Carbon Nanotubes, Chem.Phys. Let., 292:567-574 (1998).

Hafner et al., Catalytic Growth of Single-Wall Carbon Nanotubes from Metal Particles, Chem. Phys. Let., 296:195-202 (1998).

Nikolaev et al., Gas-Phase Catalytic Growth of Single-Walled Carbon Nanotubes from Carbon Monoxide, Chem. Phys. Let., 313:91-97 (1999).

Sinnott et al., Model of Carbon Nanotube Growth through Chemical Vapor Deposition, Chem. Phys. Let., 315:25-30 (1999).

Reilly et al., Direct Observation of the Evolution of the Soot Carbonization Process in an Acetylene Diffusion Flame via Real-Time Aerosol Mass Spectrometry, Combustion and Flame, 122:90-104 (2000).

Kurita et al., Measurements of Hydrogen Permeation through Fused Silica and Borosilicate Glass by Electrochemical Pumping using Oxide Protonic Conductor, Solid State Ionics, 146:101-111 (2002).

Gavillet et al., Microscopic Mechanisms for the Catalyst Assisted Growth of Single-Wall Carbon Nanotubes, Carbon, 40:1649-1663 (2002).

Scott et al., Iron Catalyst Chemistry in Modeling a High-Pressure Carbon Monoxide Nanotube Reactor, J. Nanosci. & Nanotech., 3:63-73 (2003).

Lou et al., Hydrogen Diffusion in Fused Silica at High Temperatures, J. Non-Crystalline Solids, 315:13-19 (2003).

Vinciguerra et al., Growth Mechanisms in Chemical Vapour Deposited Carbon Nanotubes, Nanotechnology, 14:655-660 (2003).

Rodgers, et al., Soot-Free Synthesis of $C_{60}$, Carbon, 41:1469-1475 (2003).

\* cited by examiner

FIGURE 1A            FIGURE 1B
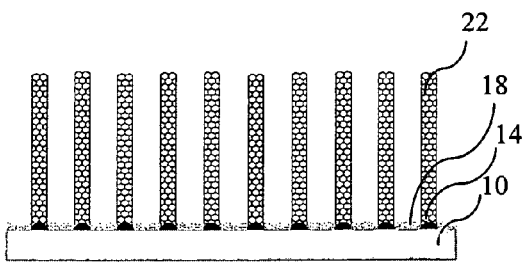
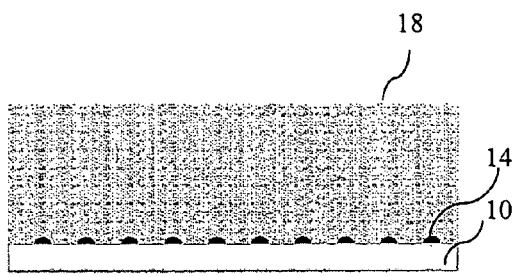
FIGURE 1C            FIGURE 1D
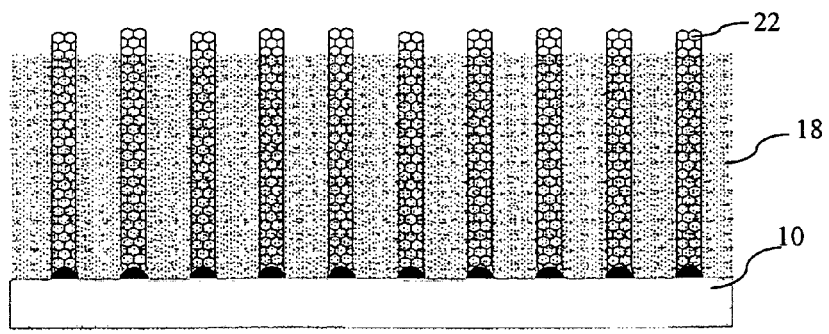
FIGURE 1E

SYSTEM AND METHOD FOR CONTROLLING HYDROGEN ELIMINATION DURING CARBON NANOTUBE SYNTHESIS FROM HYDROCARBONS

STATEMENT REGARDING FEDERALLY SPONSORED RESEARCH OR DEVELOPMENT

The United States Government has rights in this invention pursuant to Contract No. DE-AC05-000R22725 between the United States Department of Energy and UT-Battelle, LLC.

CROSS-REFERENCE TO RELATED APPLICATIONS

Not applicable.

BACKGROUND OF THE INVENTION

Hydrocarbon synthesized carbon nanotubes are grown on catalyst surfaces by reactive dehydrogenation of a high-temperature-stable hydrocarbon intermediate known as precursor soot. Dehydrogenation must occur at the interface between the metal with the nanotube and the precursor soot material in order for the nanotube to grow. The precursor soot can only lose hydrogen at the interface with the surrounding medium. Consequently, as the precursor soot film grows thicker hydrogen must diffuse further though the precursor soot medium in order to escape into the gas phase. It is this thickening of the precursor soot layer that causes the deactivation of the catalyst. A possible solution to this problem is to reduce the fuel input as the reaction rate builds. However, reducing the fuel input renders the process difficult to use in manufacturing operations.

SUMMARY OF THE INVENTION

A system for producing carbon nanotubes by chemical vapor deposition comprises a catalyst support having first and second surfaces. The catalyst support is capable of hydrogen transport from the first to the second surface. The catalyst support is substantially impermeable to the hydrocarbon fuel, precursor soot, and soot.

A catalyst is provided on the first surface of the catalyst support. The catalyst is selected to catalyze the chemical vapor deposition (CVD) formation of carbon nanotubes. A fuel source is provided for supplying the fuel to the catalyst. A pressure regulating system for regulating the partial pressure of hydrogen on the second side of the catalyst support can also be provided. The pressure regulating system can include a source of hydrogen gas and a vacuum source.

The catalyst support can be any material which does not interfere with or impede the reaction, is stable and durable at reaction conditions, and is capable of hydrogen transport. In one embodiment, the catalyst support is fused silica. The catalyst can be any catalyst suitable for the formation of carbon nanotubes by chemical vapor deposition.

A method of making carbon nanotubes comprises the steps of providing a catalyst support having first and second surfaces. The catalyst support is capable of hydrogen transport from the first surface to the second surface. A catalyst is provided on the first surface of the support. The catalyst is selected to catalyze the formation of carbon nanotubes from a hydrocarbon fuel. A fuel is supplied to the catalyst. Hydrogen is transported from the catalyst-nanotube-precursor soot interface, and through the first surface to the second surface of the catalyst support, during carbon nanotube synthesis.

BRIEF DESCRIPTION OF THE DRAWINGS

There is shown in the drawings embodiments which are presently preferred, it being understood, however, that the invention can be embodied in other forms without departing from the spirit or essential attributes thereof.

FIG. 1A is a schematic diagram of metal catalyst nanoparticles on a support.

FIG. 1B is a schematic diagram of the catalyst and catalyst support of FIG. 1A, after the deposition of a thin layer of precursor soot. This represents the ideal growth conditions for carbon nanotubes by hydrocarbon CVD FIG. 1C is a schematic diagram showing growth of carbon nanotubes on the catalyst support. This represents the conditions where CNTs are growing and may continue to grow.

FIG. 1D is a schematic diagram depicting a thick precursor soot layer on the catalyst support. This represents the condition where CNT cannot grow because hydrogen must diffuse through the precursor soot layer to be liberated as hydrogen at the precursor soot surface.

FIG. 1E is a schematic diagram illustrating the cessation of growth of carbon nanotubes on the catalyst support with controlled fuel concentration when the precursor soot layer becomes too thick.

DETAILED DESCRIPTION OF THE INVENTION

Figure 2:
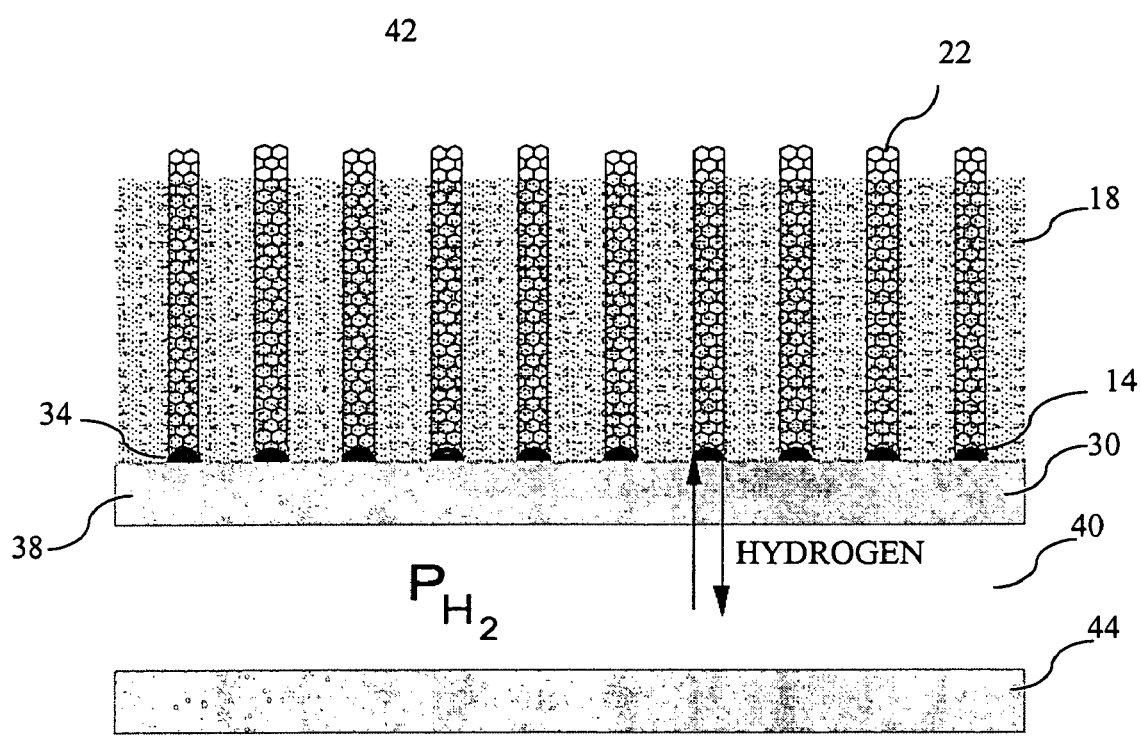
FIG. 2 is a schematic diagram illustrating the use of a partial pressure of hydrogen to control the elimination of hydrogen at the precursor soot/catalyst support interface. Elimination of hydrogen through the support provides a mechanism for continued CNT growth even when the precursor soot layer gets thick.

The chemical vapor deposition (CVD) synthesis of carbon nanotubes (CNT) from hydrocarbon in one method according to the invention utilizes a catalyst that is provided on a catalyst support. There is shown in FIG. 1A a catalyst support 10 having thereon a plurality of catalyst particles 14. The carbon nanotubes are grown on surfaces of the catalyst 14 by reactive dehydrogenation of a high-temperature-stable hydrocarbon intermediate known as precursor soot. Dehydrogenation must occur at the interface between the catalyst 14 and the nanotube and the precursor soot material in order for the tube to grow. Precursor soot is an intermediate to the formation of soot. It forms during the pyrolysis of any hydrocarbon. It is a high-temperature-stable form of liquid hydrocarbon which has a substructure that is continuously rearranging itself due to rapid exchange of hydrogen between the subunits from large amounts of carbon free radicals. Precursor soot is extremely reactive due to the presence of the radicals.

Although not required to practice the claimed invention, Applicant, not seeking to be bound by the mechanisms associated with the invention, discusses the following mechanisms believed to be occurring. During the CVD process, the hydrocarbon fuel is introduced. The hydrocarbon fuel will pyrolyze to form precursor soot. The precursor soot 18 will deposit on the surface of the catalyst support 10, as shown in FIG. 1B. In the presence of the catalyst surface, the precursor soot 18 will rearrange its structure as it loses hydrocarbon to form the more thermodynamically stable carbon nanotubes 22, as shown in FIG. 1C.

The rapid hydrogen exchange in the precursor soot medium causes the hydrogen in the medium to be in equilibrium with hydrogen in surrounding phases. Consequently, the precursor soot can spontaneously lose hydrogen without the presence of a catalyst to form soot if the temperature is too high or the gas phase hydrogen concentration is too low. The reactor conditions are preferably set to the highest temperature and hydrogen concentration without the spontaneous formation of soot to achieve the fastest CNT growth conditions. Another condition for nanotube growth is that the layer of precursor soot should be sufficiently thin that the hydrogen liberated at the catalyst/precursor soot/CNT interface can be removed into the gas phase. This will result in optimal growth as shown in FIG. 1C.

If the precursor soot is too thick, the condition shown in FIG. 1D will occur, wherein the precursor soot 18 will become so thick that hydrogen can only be lost at the interface between the precursor soot and the surrounding phases. The precursor soot and the CNT rapidly form a hydrogen equilibrium, such that the rate of hydrogen loss from CNT growth is equal to the rate of CNT uptake of hydrogen. Since hydrogen is lost to the gas phase in the production of nanotubes, greater hydrogen diffusion distances through the precursor soot 18 for liberation into the gas phase result in a slower rate of CNT growth, and can substantially preclude the growth of CNTs.

CNT growth can proceed if the fuel concentration is kept relatively low so that the precursor soot layer builds up slowly, as the CNTs continue to grow. This condition is shown in FIG. 1E. However, if the fuel input is maintained at a constant rate, the precursor soot layer 18 will eventually become too thick to maintain growth of the CNT 22 and the CNT growth rate will reduce to zero.

The invention provides a CVD system and process for producing carbon nanotubes which removes hydrogen generated during nanotube growth through a catalyst support 30 that efficiently transports hydrogen from a first surface 34 of the catalyst support 30 to a second surface 38, as shown in FIG. 2. In this manner, hydrogen liberated by nanotube growth at the catalyst 14 does not need to diffuse through the precursor soot 18 to escape to the gas phase 42. Consequently, the nanotube 22 can grow substantially unimpeded by the thickening of the precursor soot layer 18 as the nanotubes 22 grow.

The catalyst support 30 can be made from any suitable material which provides sufficient hydrogen permeability from the first surface 34 to the second surface 38 at the reaction temperatures to provide CNT growth without promoting spontaneous dehydrogenation to form less desirable forms of carbon. The mechanism for transmission of hydrogen through quartz with precursor soot acting as the hydrogen source is as yet unknown nor has the rate been quantified. It is known that crystalline graphitic carbon is formed on the inside surface of a 6.00 mm OD 3.85 mm ID quartz tube reactor when operated 700° C. with an atmospheric pressure flow of acetylene while no carbonaceous material is found in the reactor effluent. Consequently, it can be concluded that quartz has sufficient hydrogen permeability to maintain CNT growth. Molecular hydrogen has a permeability through common support materials, such as quartz, of about 1 to $10 \times 10^{-8}$ mol m$^{-2}$ s$^{-1}$ Pa$^{-1}$ at 873 K. Without wishing to be bound by theory or to limit the invention, it is believed that atomic hydrogen is transferred from the precursor soot through the support and, as such, occurs at a much faster rate than would molecular hydrogen through the same material.

Elimination of hydrogen through the catalyst support 30 to catalytically grow CNTs requires that the rate of elimination of hydrogen at the catalyst/catalyst support/precursor soot interface be controlled in order to avoid producing significant amounts of soot. There is shown in FIG. 2 a system in which the second surface 38 of the catalyst support 30 forms part of an enclosed space 40 through the provision of an opposing wall 44. The opposing wall 44 can be of a different substance than the catalyst support 30. Also, it is possible to provide the catalyst support 30 in the form of a tube so as to provide for an enclosed space 40 without the need of an opposing wall 44. The enclosed space 40 permits the control of the partial pressure of hydrogen. This can be accomplished by a suitable source of hydrogen, as well as a pressure regulator which can communicate with a vacuum source. The hydrogen partial pressure can be regulated and maintained by utilization of a vacuum pump and pressure gauge.

Figure 3:
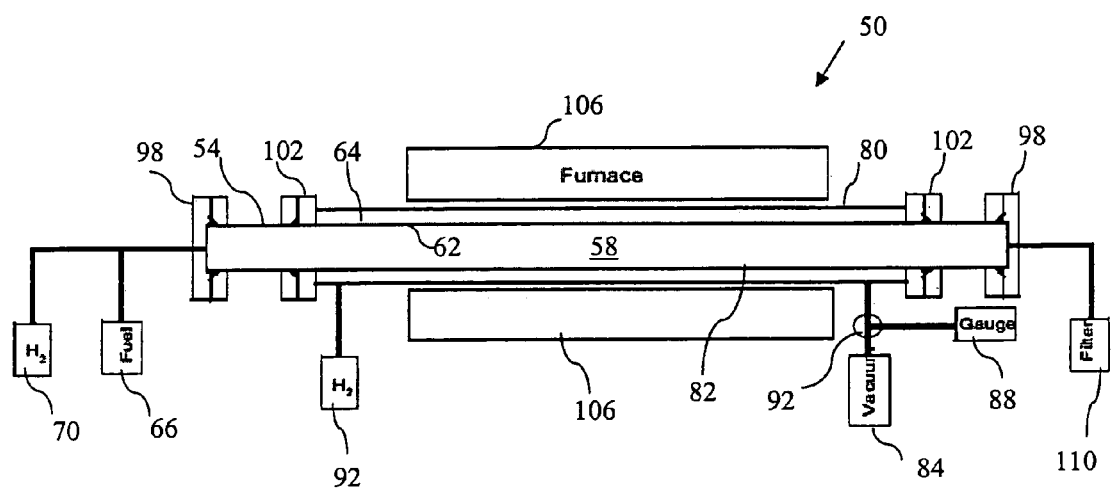
FIG. 3 is a schematic diagram of a system for forming carbon nanotubes according to the invention.

There is shown in FIG. 3, a schematic diagram of a possible reactor 50 according to the invention. The reactor 50 includes a reactor housing 54 defining a reaction chamber 58. The reactor housing 54 comprises in part the catalyst support according to the invention, such that the reactor housing 54 is capable of transporting hydrogen from an interior surface 62 to an exterior surface 64. Catalyst for CVD carbon nanotube formation is provided on the interior surface 62. A fuel source 66 and hydrogen source 70 communicate with the reaction chamber 58. An outer jacket 80 is provided to enclose the space 82 around the exterior surface 64 of the reactor housing 54 such that the partial pressure of hydrogen adjacent the exterior surface 64 can be controlled. A vacuum source 84 and gauge 88 can communicate with a valve 92 in order to control the partial pressure of hydrogen within the chamber 80 and thus at the second surface 64. A hydrogen source 92 can be provided to supply hydrogen gas to the jacket space 82.

In one embodiment, the reactor housing 54 and reactor jacket 80 are in the form of concentric tubes. Suitable sealing structure 98 can be provided to seal the reactor chamber 94, and sealing structure 102 can be provided to seal the reactor jacket 80. A furnace 106 can be provided to maintain a temperature in the reactor chamber 58 that is suitable for CVD carbon nanotube synthesis. A filter 110 can be provided as known in the art to filter the effluent from the reactor chamber 58.

Figure 4:
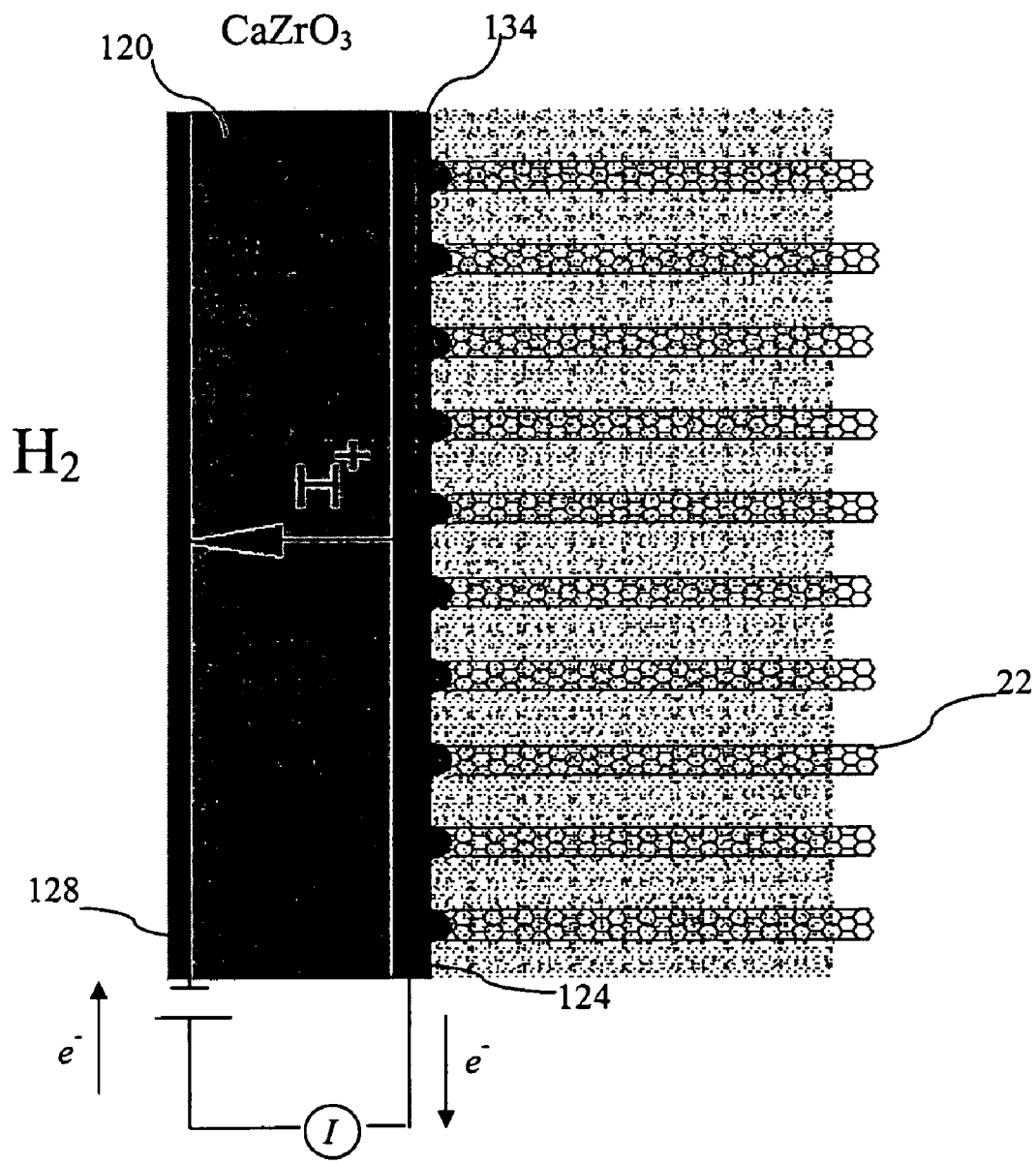
FIG. 4 is a schematic diagram illustrating the use of electrolytic regulation of hydrogen elimination in the formation of carbon nanotubes on a catalyst support. It provides another mechanism for regulated elimination of hydrogen from the catalyst/CNT/Precursor soot interface even when the precursor soot layer is thick.

Any medium which efficiently transports hydrogen and does not harm catalyst activity can be used as a catalyst support according to the invention. Suitable catalyst supports, in addition to silica, include any material that has been used as a high temperature membrane for hydrogen separation and catalytic dehydrogenation such as Pd and it alloys, Nickel alloys such as V—Ni alloys, Fe CR alloys, Tantalum based material, and cerium oxide materials. Catalysts suitable for use with the invention include any catalyst capable of catalyzing CVD synthesis of CNTs. Suitable catalysts include Pt, Ni, Fe, and Co. Other catalysts are possible. There is shown in FIG. 4 a support in the form of a proton conductive membrane 120 equipped with electrode surfaces 124, 128 on both sides of the membrane. The membrane 120 could be used in combination with a hydrogen permeable catalyst support layer 134, such as fused silica. Alternatively, the membrane material could be selected to be used directly as a catalyst support. The potential across the electrodes 124 and 128 can be adjusted such that the removal of hydrogen is controlled and the reaction forming the nanotubes 22 can be optimized. The membrane can be of any suitable material. An In-doped $CaZrO_3$ membrane with porous Pt electrodes has been used to regulate the permeation of hydrogen through fused silica. Such a structure could be used in connection with a fused silica catalyst support, or any other hydrogen transport membrane. Regulation of the current regulates the rate of hydrogen elimination.

According to the invention, a catalyst support having first and second surfaces is provided and the catalyst material is selected to be capable of hydrogen transport from the first surface to the second surface. A catalyst for CVD carbon nanotube synthesis is provided on the first side of the support. A fuel is provided to the catalyst under conditions of temperature and pressure suitable for carbon nanotube synthesis. The hydrogen is transported from the first surface to the second surface so as to permit the growth of carbon nanotubes and to reduce the rate-limiting presence of hydrogen at the catalyst/precursor soot/CNT interface. The rate of hydrogen elimination through the catalyst support can be regulated by the regulation of the hydrogen partial pressure at the second surface, and optionally by other methods such as the regulation of current across a proton conductive membrane.

This invention can be embodied in other forms without departing from the spirit or essential attributes thereof and, accordingly, reference should be had to the following claims rather than the foregoing specification as indicating the scope of the invention.

I claim:

1. A system for producing carbon nanotubes by chemical vapor deposition, comprising:
   a tubular catalyst support having first and second sides, said catalyst support being capable of hydrogen transport from said first to said second side;
   a catalyst on said first side of said catalyst support, said catalyst selected to catalyze the chemical vapor deposition formation of carbon nanotubes;
   a reactor jacket, said reactor jacket forming with said second side of said catalyst support an enclosed space for controlling partial pressure of hydrogen at the second side of the catalyst support;
   a pressure regulator for adjusting the partial pressure of hydrogen gas in said enclosed space; and
   a fuel source for supplying fuel to said catalyst,
   wherein said first side is an inside surface of said tubular catalyst support.

2. The system of claim 1, wherein said pressure regulator comprises a vacuum pump.

3. The system of claim 1, wherein said reactor jacket is in the form of a tube, said catalyst support and said reactor jacket forming concentric tubes.

4. The system of claim 1, wherein said catalyst support comprises fused silica.

5. The system of claim 1, wherein said catalyst comprises a plurality of nanotube catalyst particles.

6. The system of claim 1, further comprising, a hydrogen source for supplying hydrogen gas to said enclosed space.

7. A reactor for the formation of carbon nanotubes by chemical vapor deposition, comprising:
   an inner conduit comprising a hydrogen permeable material;
   an outer conduit;
   the inner conduit being at least partially within said outer conduit; wherein said outer conduit forming with an outside of said inner conduit an enclosed space for controlling partial pressure of hydrogen; and
   (i) a pressure regulator arranged for adjusting the partial pressure of hydrogen gas in said enclosed space,
   (ii) wherein said tubular catalyst support comprises a proton conductive membrane comprising electrode surfaces on each side of the proton conductive membrane, said electrode surfaces being provided to control current across said proton conductive membrane, or
   (iii) both.

8. The reactor of claim 7, wherein CVD reactants are transported through one of said inner conduit and outer conduit, and hydrogen is pumped from the other one of said inner conduit and outer conduit.

9. The reactor of claim 8, wherein a CVD carbon nanotube formation catalyst is provided on a surface of said inner conduit so as to contact said reactants.

10. The reactor of claim 7, comprising a pressure regulator arranged for adjusting the partial pressure of hydrogen gas in said enclosed space.

11. The reactor of claim 10, further comprising, a hydrogen source for supplying hydrogen gas to an enclosed space formed between said inner conduit and said outer conduit.

12. A system for producing carbon nanotubes by chemical vapor deposition, comprising:
   a tubular catalyst support having first and second sides, said catalyst support being capable of hydrogen transport from said first to said second side, wherein said tubular catalyst support comprises a proton conductive membrane comprising electrode surfaces on each side of the proton conductive membrane, said electrode surfaces being provided to control current across said proton conductive membrane;
   a catalyst on said first side of said catalyst support, said catalyst selected to catalyze the chemical vapor deposition formation of carbon nanotubes;
   a reactor jacket, said reactor jacket forming with said second side of said catalyst support an enclosed space for controlling partial pressure of hydrogen at the second side of the catalyst support; and
   a fuel source for supplying fuel to said catalyst,
   wherein said first side is an inside surface of said tubular catalyst support.

13. A method of making carbon nanotubes, comprising the steps of:
   providing a tubular catalyst support having first and second sides, said catalyst support being capable of hydrogen transport from said first side through said catalyst support to said second side;
   providing a catalyst on said first side of said support, said catalyst selected to catalyze the CVD formation of carbon nanotube from a hydrocarbon fuel;
   supplying a fuel to the catalyst; and
   transporting hydrogen from said first side to said second side during carbon nanotube synthesis.

14. The method of claim 13, further comprising, supplying hydrogen gas to said second side.

* * * * *